Feb. 9, 1954 B. T. WILSON 2,668,943

DYNAMIC DIODE TESTER

Filed Feb. 16, 1951

INVENTOR.

Bernard T. Wilson

Patented Feb. 9, 1954 2,668,943

UNITED STATES PATENT OFFICE 2,668,943

DYNAMIC DIODE TESTER

Bernard T. Wilson, Los Angeles, Calif., assignor, by mesne assignments, to Computer Research Corporation of California, a corporation of Delaware Application February 16, 1951, Serial No. 211,241

6 Claims. (Cl. 324—57)

This invention relates to crystal diode testing devices and more particularly to means for testing crystal diodes under dynamic operating conditions as met in computer circuits.

Crystal diodes or rectifiers are very useful as components in diode networks for interconnecting flip-flops as required in binary digital computer systems. It has been found that all the logical operations needed for operating on the digital information set up in the computer can be performed by gating and mixing circuits comprised primarily of crystal diodes and resistors. Consequently as many as a thousand or more of these diodes may be used in one computer.

Crystal diodes have heretofore been tested for the ratio of forward to back resistance. These tests are normally carried out by applying steady state D. C. voltages across the diodes causing them to conduct in both directions. The ratio of the resistance readings then provides a useful criterion as to the rectifying ability of the diode.

Extensive use of diodes in computer networks has now revealed that another characteristic of diodes is of extreme importance. This characteristic is actually of a transient or dynamic nature in that when a D. C. voltage is impressed across a diode, the forward resistance at the first instance of the application of the D. C. voltage may not be the same as for the steady state condition.

Because of the manner of using these diodes, to form gates, for example, this characteristic prevents the trailing edge of the output pulse from the gate, when differentiated, from giving the desired signal.

Briefly stated, the present invention comprises a means for applying first a symmetrical square wave voltage and then a steady state D. C. voltage having the same peak value, across the diode to be tested. If the test diode has good transient characteristics a voltmeter across the diode would read exactly one-half the steady state reading when energized by the square wave. Actually, switching means are provided for increasing the scale of the voltmeter by two when the steady D. C. is applied. Thus a consistent reading on the voltmeter is indicative of a diode with good transient characteristics.

In any batch of commercial crystal diodes, a probability exists that some of them exhibit this undesirable characteristic under dynamic conditions.

It is thus the object of this invention to provide a novel simple means for testing crystal diodes under dynamic operating conditions.

This invention will be better understood from the following description considered in connection with the accompanying drawings and its scope is indicated by the appended claims.

Referring to the figures of the drawings.

Figures 2, 3A:
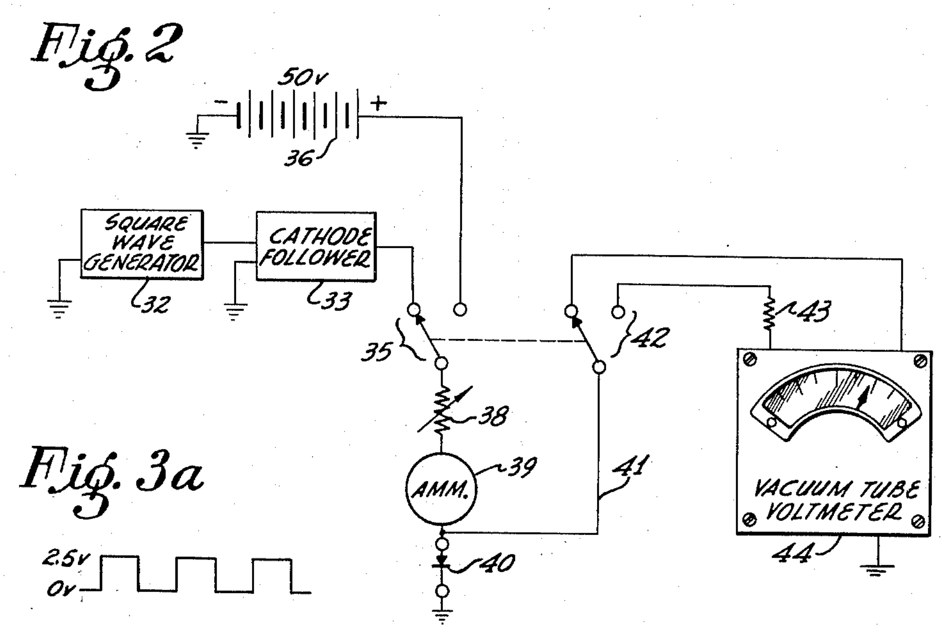
Figure 2 is the circuit diagram of the present invention which provides means for testing the forward resistance of the diode under dynamic operating conditions.
Figure 3B:
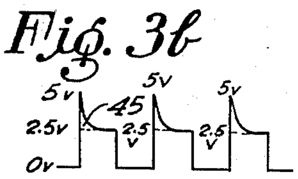
Figure 3C:
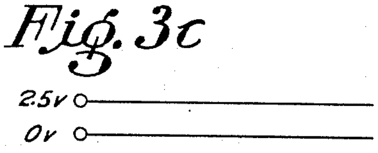

Figures 3*a*, 3*b*, and 3*c* are graphs that are referred to in explaining the operation of the circuit shown in Fig. 2.

Figure 1:
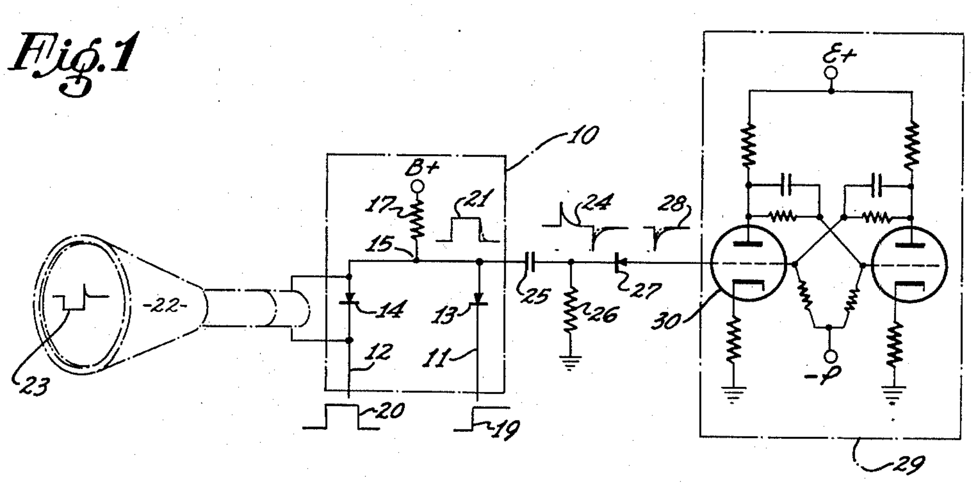
Figure 1 is a circuit diagram of a diode gate circuit as used in digital computers revealing the nature of the dynamic characteristic of a good and bad diode on the gate output signal waveform.

Referring first to Figure 1, a typical diode gate circuit 10, as used in a digital computer, together with the waveforms shown, illustrates the particular operating characteristic of the crystal diode which is to be tested by the circuit comprising the present invention.

Here it is seen that the right and left inputs 11 and 12 respectively to the gate 10 are fed through the cathode equivalent ends of diodes 13 and 14 whose plate ends are joined to a common junction 15. This junction 15 is connected to a positive source $B^+$ through a load resistor 17.

This gate circuit 10 is such that normally current flows from the positive source $B^+$ through load resistor 17; through each of the diodes 13 and 14 in parallel to the low potential of the inputs. Thus common junction 15 from which the output of the gate 10 is taken is normally at a relatively low potential level.

It should be noted that because of nonlinearities in the voltage vs. current characteristics of individual diodes, the current flow through each of the two diodes 13 and 14 as shown in gate 10, may be considerably different. It is possible, for example, that substantially less current might flow through say the left diode 14 than the right diode 13 for the same voltage across the diodes.

In operation of gate 10, the potentials applied to the inputs 11 and 12 can only have two values. Any time right input 11 has a high potential such as shown by wave 19, a square wave clock pulse 20 applied on the left input 12 reduces the current flow through the load resistor 17 for the duration of the clock pulse, thus bringing common junction 15 during this period to its relatively high potential. Describing this event in greater detail, the step potential at the leading edge of the clock pulse 20 suddenly reduces the flow of current through load resistor 17 so that the leading edge of the output wave 21 is relatively steep; however, the trailing edge of the clock pulse 20 again impresses a voltage across the left diode 14 so as to cause it to increase the current flow there through in a forward direction. It is the sudden application of an increased voltage across the left diode 14 that produces the undesirable transient effect when the diode is bad. The initial resistance of a bad diode is large; thus an appreciable time is required for the trailing edge of the output pulse 21 from the gate 10 to drop to the steady state conducting value. An oscilloscope 22 connected across the left diode 14 would show a wave pattern such as 23 on its screen when the diode 14 is functioning improperly.

As seen in Figure 1, this output square wave pulse 21 from the gate 10 is differentiated by means of capacitor 25 and resistor 26; and the positive leading wave is then attenuated in a series diode 27. The negative trailing wave which passes through the series diode 27 is the output signal 28 which is applied to the grid of triode 30 for triggering off the left tube 30 of a flip-flop 29.

Flip-flop 29 is a conventional two stable state circuit and will not be further described.

When the left diode 14 is functioning as required, the output pulse from the gate 10 has a negative pulse form as shown by the solid output signal 28. This signal is of the required negative magnitude not only to cut off the tube 30 but also to include a safety factor desired by the designer of the circuits for ageing of the tubes. On the other hand, if the diode 14 has the undesirable dynamic characteristic, the output gives a negative pulse having a form as shown by the dotted output signal 28. This latter signal does not have the magnitude required for triggering the tube 30.

Thus it can be seen that the reliability and life of these computing circuits are greatly improved by diodes having proper dynamic characteristics.

Referring next to Figure 2, a preferred circuit diagram of the present invention for testing this dynamic forward characteristic of a diode is shown.

Here square wave generator 32, feeding through a cathode follower 33, emits a symmetrical square wave train (similar to that shown in Figure 3*a*) into one terminal of a first two-way switch 35. This square wave has for example a 50 v. peak voltage value. A 50 v. D. C. steady state voltage having the same base potential as the square wave is supplied by source 36. This latter voltage is applied to the other terminal of the switch 35. The output of switch 35 contains an adjustable resistor 38 in series with an ammeter 39. A diode 40 which is to be tested is positioned between the ammeter 39 and ground. This diode 40 is orientated so that the applied potential causes the diode 40 to conduct in a forward direction. The positive terminal of the diode 40 is connected by a line 41 to a second two-way switch 42 coupled to be manually operated simultaneously with the first switch 35. When first switch 35 connects the square wave across the circuit, the second switch 42 is connected to provide a given scale range reading on the vacuum tube voltmeter 44; and, when the first switch 35 connects the D. C. voltage across the circuit, the second switch 42 is connected through scale resistor 43 so as to increase the scale range of the vacuum tube voltmeter 44 by two.

In operation, with the first switch 35 in the position as shown in the drawing, connected to the square wave generator 32, the current adjusting variable resistor 38 is set so that the current meter 39 reads some safe value, say 25 ma. Since the square wave is symmetrical, and the ammeter 39 is inherently an averaging device, this reading will correspond to a peak forward current through the test dioide 40 of 50 ma. At this peak current, the test diode 40 will have a voltage across it depending on its forward resistance at this current. Assuming the test diode 40 under consideration has a good dynamic characteristic, this voltage will be a square wave, as shown in Figure 3*a*. This square wave voltage is averaged by the vacuum tube voltmeter 44, so that it reads one-half of the peak voltage developed across the test diode 40.

If the first switch 35 is now changed to connect the D. C. source 36 across the circuit, the voltage across the diode 40 will be as shown in Figure 3*c*. The actual current and voltage values will now be exactly twice the average square wave value. However, simultaneously, the scale range of the voltmeter 44 has been increased by two so that the reading thereon should be the same.

Now suppose the diode 40 is faulty in that it has a high forward resistance during the first instant of forward conduction. This will result in the wave across the diode 40 when impressed by the square wave, to have the form as shown in Figure 3*b*. This will cause the voltage reading on the voltmeter 44, upon application of the square wave voltage to the circuit, to be actually greater than half the reading thereon upon application of the steady D. C. voltage; but since the vacuum tube voltmeter 44 is an averaging device and the scale has been halved, any deviation between readings of the vacuum tube voltmeter 44 when the test diode 40 is energized by each source is a measure of the area 45 of the waveforms of Figure 3*b*. This area corresponds to the dynamic resistance variation of the test diode 40 and by proper calibration of the vacuum tube voltmeter 44, diodes having undesirable dynamic characteristics can be easily detected.

While the circuit as shown and described herein is admirably adapted to fulfill the features of advantage previously enumerated as desirable, it is to be understood that the invention is not to be limited to the specific features shown but that the means and construction herein disclosed are susceptible of modification in form, proportion and arrangement of parts without departing from the principle involved or sacrificing any of its advantages, and the invention is therefore claimed in embodiments of various forms all coming within the scope of the claims which follow.

What is claimed:

1. A dynamic crystal diode testing circuit comprising a source of D. C. potential, a source of symmetrical square wave potential having the same peak and base values as said D. C. potential, a circuit including a resistance in series with said crystal diode, a two-position switch for connecting said sources one at a time across said circuit, and a voltmeter adapted for indicating average measurements connected across said crystal diode, whereby the average potential value across said crystal diode during application of said square wave is one-half the potential value during application of said D. C. source when said crystal diode has a favorable dynamic response.

2. A circuit for the dynamic testing of rectifiers comprising: means for providing a D. C. potential; means for providing a square wave potential having the same limiting values as said D. C. potential; connector means for establishing a connection to said rectifier; a circuit including a resistor in series with said connector means; switching means for selectively connecting either of said potential means to said circuit; and means for measuring the potential developed across said rectifier on application of each of said potentials to said circuit.

3. In a testing device for measuring the forward dynamic response of a rectifier: means for providing a direct current; means for providing a current whose voltage has a square wave form with the same peak and base values as said direct current; conductor means for establishing a connection to said rectifier; a resistor in series with said conductor means; a first switch for selectively connecting said current-providing means to said resistor and conductor means to cause current to flow through said rectifier in a forward direction; a voltmeter connected across said rectifier; and a second switch interconnected with said first switch and operable to increase the scale range of said voltmeter when said direct current is applied to said rectifier, whereby the reading on said voltmeter remains substantially constant when said rectifier has a favorable dynamic characteristic.

4. A circuit for measuring the forward dynamic response of a rectifier on application of a step voltage, comprising: means for providing a voltage having a cyclic waveform with a steep wavefront from a low to high voltage level; means for providing a substantially constant voltage whose value has a defined relationship with respect to the mentioned voltage providing means; conductor means for establishing a connection to said rectifier; a series circuit including a resistor and said conductor means; switching means for selectively connecting said voltage providing means to said circuit so as to cause current to flow through said rectifier in a forward direction; and means for measuring the voltages developed across said rectifier while each of said voltage providing means is connected to said circuit.

5. A circuit for measuring the forward dynamic response of a rectifier on application of a voltage having a steep wavefront, comprising: a first power means providing a voltage having a cyclic waveform with a steep wavefront from a low to high voltage level; a second power means providing a D. C. voltage whose magnitude has a defined relationship with respect to the average value of the voltage of said first power means; conductor means for establishing a connection to said rectifier; a series circuit including a resistor and said conductor means; switching means for selectively connecting said first and second power means to said circuit so as to cause current to flow through said rectifier in a forward direction; and a voltage metering system adapted to measure the average voltage across said rectifier and to indicate the departure from the defined relationship of said voltages, caused by a variation in the forward dynamic resistance of said rectifier in response to the voltage from said first power means.

6. A circuit for measuring the variation in forward resistance of a rectifier on application of a voltage having a steep wavefront, comprising: a first source of power providing a voltage having a recurring waveform with a steep wavefront from a low to high voltage level; a second source of power providing a D. C. voltage whose value has a defined relationship with respect to the average value of the voltage of said first source of power; conductor means for establishing a connection to said rectifier; a series circuit including a resistor and said conductor means; a first switching means for successively applying said first and second voltage sources to said series circuit for causing current to flow through said rectifier in a forward direction; a voltmeter adapted to measure the average voltage across said rectifier; and a second switching means interconnected with said first switching means and operable to increase the scale range of said voltmeter in accordance with said defined relationship, whereby the reading on said voltmeter remains substantially constant on operation of said switching means when said rectifier has a favorable dynamic characteristic.

BERNARD T. WILSON.

References Cited in the file of this patent

UNITED STATES PATENTS

| Number | Name | Date |
|---|---|---|
| 1,933,274 | Ludwig | Oct. 31, 1933 |
| 2,408,858 | Keizer | Oct. 8, 1946 |
| 2,409,419 | Christaldi | Oct. 15, 1946 |
| 2,459,849 | Stateman | Jan. 25, 1949 |
| 2,517,977 | Cole et al. | Aug. 8, 1950 |
| 2,574,682 | Ancona, Jr. | Nov. 13, 1951 |
| 2,585,353 | Strum | Feb. 12, 1952 |

OTHER REFERENCES

Electronics, Sept. 1944, pages 138–140, 336, 338.